United States Patent
Cha et al.

(10) Patent No.: US 9,494,226 B2
(45) Date of Patent: Nov. 15, 2016

(54) PULLEY STRUCTURE AND DAMPER PULLEY

(71) Applicants: Hyundai Motor Company, Seoul (KR); Kia Motors Corporation, Seoul (KR); Halla Visteon Climate Control Corp., Daejeon (KR)

(72) Inventors: Yong Woong Cha, Yongin-si (KR); Byeong Jun Lee, Ulsan (KR); Man Hee Park, Suwon-si (KR); Jungha Park, Gunpo-si (KR); Sung Taeg Oh, Daejeon (KR); Suk Jae Chung, Daejeon (KR)

(73) Assignees: HYUNDAI MOTOR COMPANY, Seoul (KR); KIA MOTORS CORPORATION, Seoul (KR); HALLA VISTEON CLIMATE CONTROL CORP., Daejeon (KR)

( * ) Notice: Subject to any disclaimer, the term of this patent is extended or adjusted under 35 U.S.C. 154(b) by 224 days.

(21) Appl. No.: 14/338,133

(22) Filed: Jul. 22, 2014

(65) Prior Publication Data

US 2015/0184736 A1    Jul. 2, 2015

(30) Foreign Application Priority Data

Dec. 26, 2013   (KR) ................. 10-2013-0164099

(51) Int. Cl.
   *F16H 55/36*   (2006.01)
(52) U.S. Cl.
   CPC ......... *F16H 55/36* (2013.01); *F16H 2055/366* (2013.01)
(58) Field of Classification Search
   CPC .............................. F16H 55/36; F16H 55/366
   USPC ................................................... 474/94, 166
   See application file for complete search history.

(56) References Cited

U.S. PATENT DOCUMENTS

| | | | | |
|---|---|---|---|---|
| 2001/0048241 A1* | 12/2001 | Yoshimura | ............... | B60B 3/044 301/37.101 |
| 2005/0245337 A1* | 11/2005 | Matsuyama | ............ | F16H 55/36 474/199 |
| 2016/0123453 A1* | 5/2016 | Starodoubov | .......... | B60K 25/02 474/94 |

FOREIGN PATENT DOCUMENTS

| | | |
|---|---|---|
| CN | 2929299 Y | 8/2007 |
| JP | 60-85647 U | 6/1985 |
| JP | 61-184491 U | 11/1986 |

(Continued)

*Primary Examiner* — William E Dondero
*Assistant Examiner* — Robert T Reese
(74) *Attorney, Agent, or Firm* — Morgan, Lewis & Bockius LLP

(57) ABSTRACT

Disclosed are a pulley structure and a damper pulley that prevent corrosion. The pulley structure may include a hub part that is fitted on a crankshaft rotated by power from an engine and rotates with the crankshaft and a pulley part coupled with the hub part to rotate with the hub part and connected with a power transmission member. The hub part may include a pulley contact surface facing the pulley part, and pulley coupling portions formed at the pulley contact surface to secure coupling members. The pulley part may include a hub contact surface facing the pulley contact surface of the hub part, hub coupling portions coupled to the pulley coupling portions by securing the coupling members, and coupling grooves recessed from the hub coupling portions to insert the coupling members. Washers made of an insulator may be fitted on the coupling members between the pulley coupling portions and the hub coupling portions.

3 Claims, 6 Drawing Sheets

(56) References Cited

FOREIGN PATENT DOCUMENTS

JP  8-20446 A  8/1996
JP  8-200446 A  8/1996
KR  10-2006-002995 A8  4/2006

\* cited by examiner

PULLEY STRUCTURE AND DAMPER PULLEY

CROSS-REFERENCE TO RELATED APPLICATION

The present application claims priority of Korean Patent Application Number 10-2013-0164099 filed on Dec. 26, 2013, the entire contents of which application are incorporated herein for all purposes by this reference.

BACKGROUND OF INVENTION

1. Field of Invention

The present invention relates to a pulley structure and a damper pulley. More particularly, the present invention relates to a pulley structure and a damper pulley which are prevented from corroding due to a potential difference.

2. Description of Related Art

In general, a damper pulley is directly fitted on a crankshaft and rotates with it to be able to directly receive torque from the crankshaft that are rotated by an engine. The damper pulley transmits the torque of the engine from the crankshaft to accessories such as a water pump, a power steering system, and an air conditioner.

The damper pulley is formed by combining a hub part, which is fitted on a crankshaft rotated by power from an engine and rotates with it, with a pulley part, which rotates with the hub and is connected with a power transmission member. The hub part and the pulley part may be bolted. When the hub part and the pulley part are bolted, the pulley part that is made of an aluminum alloy or a magnesium alloy and coupling members such as bolts that are made of steel are in contact with each other.

However, when the pulley part made of an aluminum alloy or a magnesium alloy, a side of the hub part made of steel, and the coupling members made of steel are in direction contact with each other, corrosion may be caused by the potential difference between two different metallic materials.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a pulley structure and a damper pulley having advantages of being prevented from corroding due to the potential difference between constituent elements.

Various aspects of the present invention provide a pulley structure including a hub part that is fitted on a crankshaft rotated by power from an engine and rotates with the crankshaft and a pulley part coupled with the hub part to rotate with the hub part and connected with a power transmission member. The hub part may include a pulley contact surface facing the pulley part, and pulley coupling portions formed at the pulley contact surface to secure coupling members. The pulley part may include a hub contact surface facing the pulley contact surface of the hub part, hub coupling portions coupled to the pulley coupling portions by securing the coupling members, and coupling grooves recessed from the hub coupling portions to insert the coupling members. Washers made of an insulator may be fitted on the coupling members between the pulley coupling portions and the hub coupling portions.

The washers may be pressed by the pulley coupling portions and the hub coupling portions and may be elastically deformed to prevent liquid from flowing into the coupling grooves. The hub coupling portions may protrude at a predetermined level from the hub contact surface.

Various other aspects of the present invention provide a damper pulley including a hub part that is fitted on a crankshaft rotated by power from an engine and rotates with the crankshaft and a pulley part coupled with the hub part to rotate with the hub part and connected with a power transmission member. The hub part may include an outer ring coupled with the pulley part, an inner ring disposed inside the outer ring, a damper rubber disposed between the outer ring and the inner ring, a pulley contact surface on the outer ring facing the pulley part, and pulley coupling portions formed at the pulley contact surface so that coupling members pass through the outer ring. The pulley part may include a hub contact surface facing the pulley contact surface of the hub part, hub coupling portions coupled to the pulley coupling portions by securing the coupling members, and coupling grooves recessed from the hub coupling portions to insert the coupling members. A molding made of an insulator may be coated on the pulley contact surface.

The hub coupling portions may protrude at a predetermined level from the hub contact surface. The molding may extend from the damper rubber between the outer ring and the inner ring of the hub part to cover the pulley contact surface.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
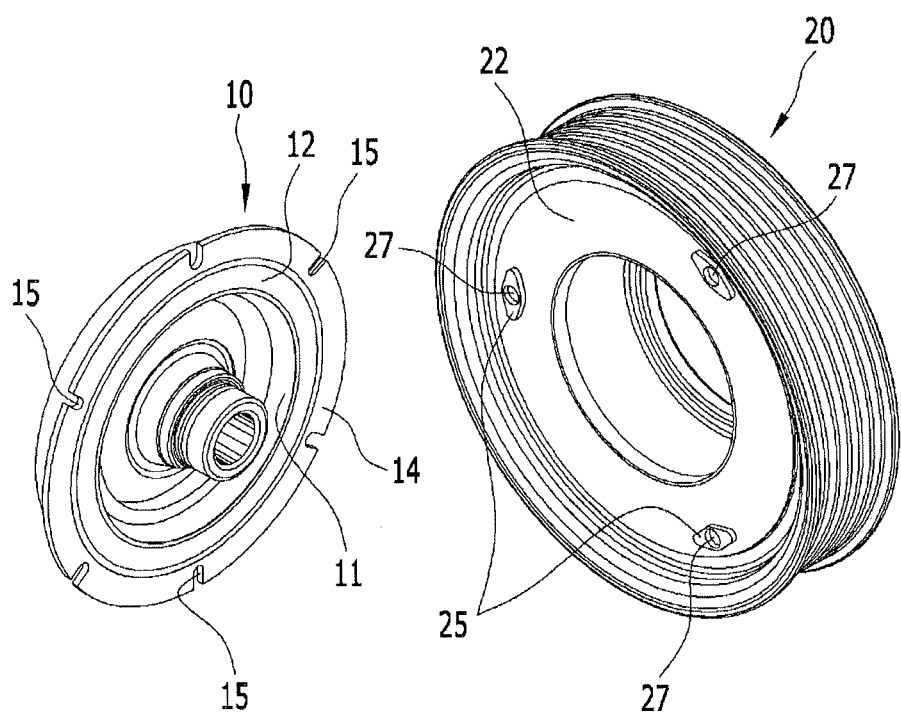
FIG. 1 is an exploded perspective view showing an exemplary damper pulley according to the present invention.

FIG. 1 is an exploded perspective view showing a damper pulley according to an exemplary embodiment of the present invention. As shown in FIG. 1, a damper pulley according to an exemplary embodiment of the present invention includes a hub part 10 and a pulley part 20.

In this specification, the combination and contact of the hub part 10 and the pulley part 20 are described and the basic configurations of the hub part 10 and the pulley part 20 of the damper pulley are illustrated in the figures.

The hub part 10 has a pulley contact surface 12 and pulley coupling portions 15. The pulley contact surface 12 is the side that is brought in contact with the pulley part 20. The shape of the pulley contact surface 12 is the shape of a circular or a substantially circular disc fitting to or in accord with the shape of the hub part 10. Further, the pulley contact surface 12 is formed in the shape of a hollow disc so that the constituent elements of the hub part 10 are disposed radially inside. The pulley contact surface 12 is a side of the wing, which radially extends, of an outer ring 14 of the hub part 10. Examples of the outer ring 14 of the hub part 10 and the wing of the outer ring 14 are illustrated in the figures.

The pulley coupling portions 15 may be grooves recessed radially inward from the outer circumference of the pulley contact surface 12. That is, they are recessed from the outer circumference of the wing of the outer ring 14. Further, a plurality of pulley coupling portions 15 is formed around the pulley contact surface 12. The pulley coupling portions 15 may be arranged with regular intervals along the circumference of the hub part 10 and the pulley contact surface 12. The hub part 10 and the pulley part 20 are combined by securing the coupling members 30 to the pulley part 20 through the pulley coupling portions 15 (see FIGS. 2A and 2B). Although the pulley coupling portions 15 are formed in the shape of a groove recessed from the outer circumference of the pulley contact surface 12, they are not limited thereto and may be formed in the shape of a circular or substantially circular hole through which the coupling members 30 are inserted. For example, the coupling members 30 may be bolts or rivets.

The pulley part 20 has a hub contact surface 22, hub coupling portions 25, and coupling grooves 27.

The hub contact surface 22 is a side that is brought in contact with the pulley contact surface 12 of the hub part 10. Further, the hub contact surface 22 is formed in the shape of a hollow circle or a substantially hollow circle fitting to or in accord with the shape of the pulley part 20. That is, the hub contact surface 22 is a side of the pulley part 20 formed in the shape of a hollow cylinder.

The hub coupling portions 25 are coupled to the pulley coupling portions 15. Further, the hub coupling portions 25 protrude from the hub contact surface 22. A plurality of hub coupling portions 25 may be formed around the hub contact surface 22. The hub coupling portions 25 may be formed with regular intervals, corresponding to the positions of the pulley coupling portions 15 and the pulley coupling portions 15 are formed at least as many as the hub coupling portions 25.

The coupling grooves 27 are recessed in the axial direction of the pulley part 20 from the hub coupling portions 25. The hub part 10 and the pulley part 20 are combined by securing the coupling members 30 into the coupling grooves 27 through the pulley coupling portions 15 (see FIGS. 2A and 2B).

Figure 2A:
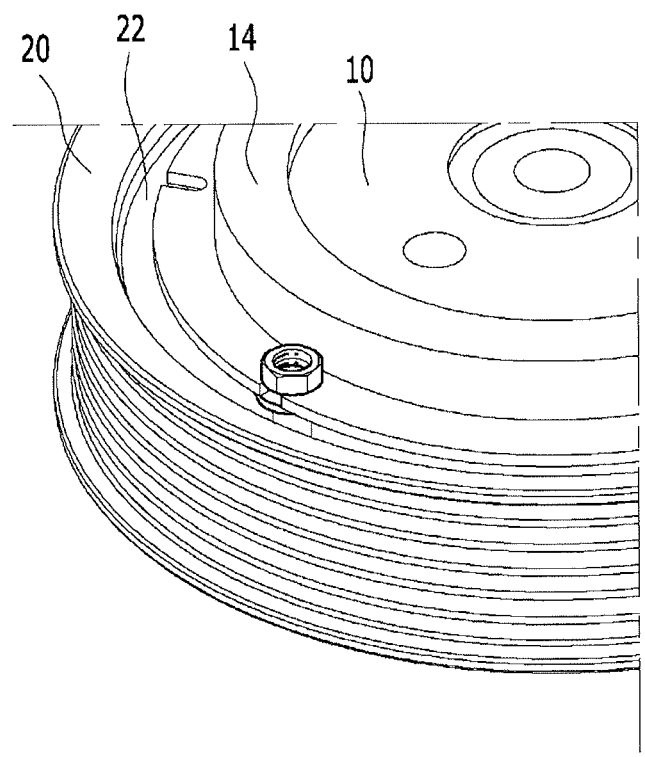
FIG. 2A is a perspective view showing an exemplary assembled damper pulley according to the present invention.
Figure 2B:
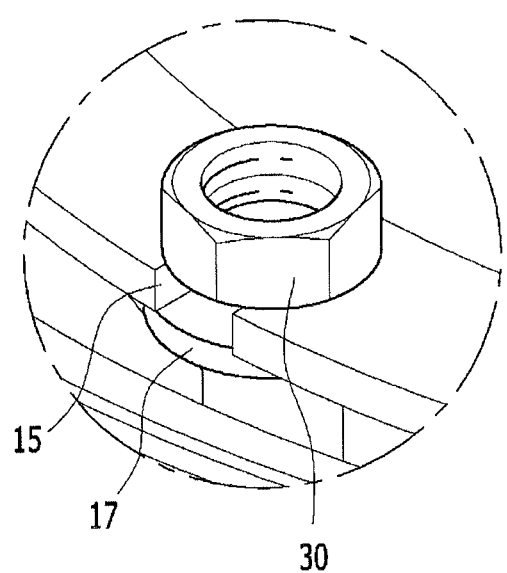
FIG. 2B is a partially enlarged view of FIG. 2A.

FIG. 2A is a perspective view showing an assembled damper pulley according to an exemplary embodiment of the present invention. FIG. 2B is a partially enlarged view of FIG. 2A. As shown in FIGS. 2A and 2B, when the coupling member 30 is inserted into the coupling groove 27 through the pulley coupling portion 15 of the outer ring 14, a washer 17 is disposed between the pulley contact surface 12 and the hub contact surface 22. That is, the washer 17 is disposed between the pulley coupling portion 15 and the hub coupling portion 25.

The washer 17 is made of an insulator. For example, the washer 17 may be made of plastic or rubber. Further, the washer 17 may be formed in the shape of a ring so that the coupling member 30 passes through it. Since the plastic washers 17 are disposed between the pulley coupling portions 15 and the hub coupling portions 25, direct contact between the coupling portions 25 of the pulley part 20 and the coupling members 30 is prevented. Further, direct contact between the hub coupling portions 25 of the pulley part 20 and the outer ring 14 is prevented. Accordingly, corrosion of the pulley part 20, the coupling members 30, and the outer ring 14 due to the potential difference between the pulley part 20 made of an aluminum alloy or a magnesium alloy and the coupling members 30 and the outer ring 14 that are made of steel can be prevented. The washers 17 between the pulley coupling portions 15 and the hub coupling portions 25 are pressed by securing the coupling members 30, such that liquid that corrodes metal is prevented from flowing into the coupling grooves 27 by the close-contact force due to elastic deformation of the washers 17.

Figure 3:
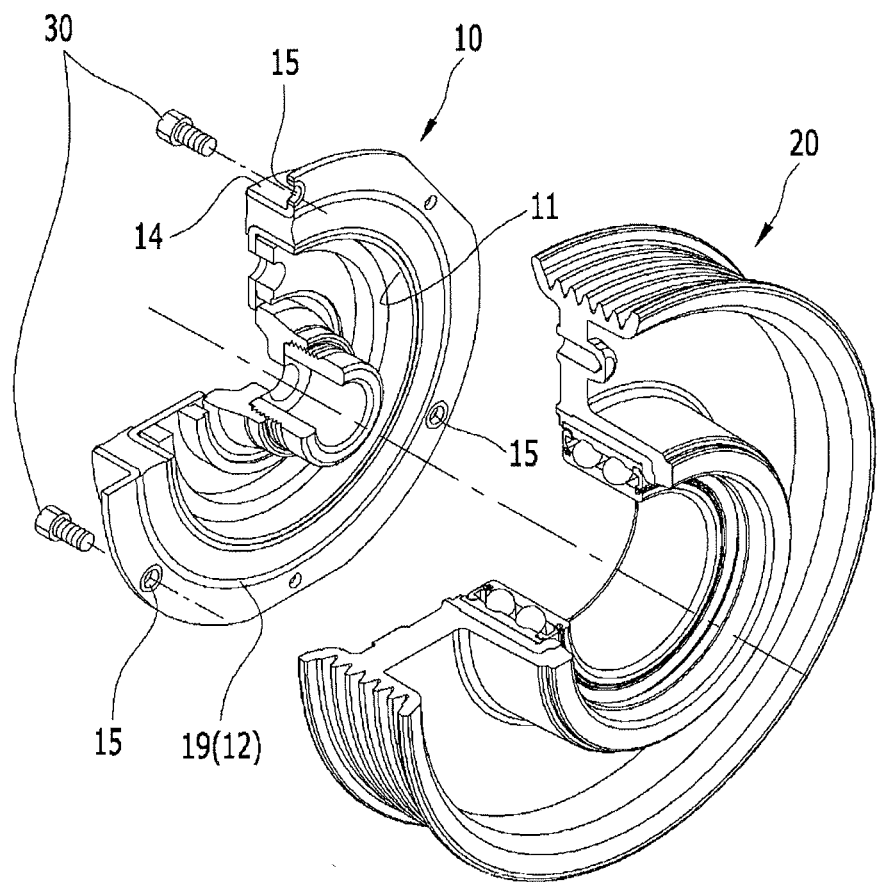
FIG. 3 is an exploded perspective view showing another exemplary damper pulley according to the present invention.

FIG. 3 is an exploded perspective view showing a damper pulley according to another exemplary embodiment of the present invention. As shown in FIG. 3, the damper pulley according to another exemplary embodiment of the present invention further includes a molding in comparison to the damper pulley according to the previous exemplary embodiment of the present invention.

The molding 19 is made of an insulator. For example, the molding 19 may be made of rubber. The molding 19 is coated or overlaid on the pulley contact surface 12. The molding 19 may extend to cover the pulley contact surface 12 from a damper rubber 18 disposed between the outer ring 14 of the hub part 10 and the inner ring 11 inside the outer ring 14. Examples of the outer ring 14, inner ring 11, and the damper rubber 18 of the hub part 10 are illustrated in the figures.

Pulley coupling portions 15 formed in the shape of a circular hole or a substantially a circular hole, as described above, are shown in FIG. 3.

Figure 4:
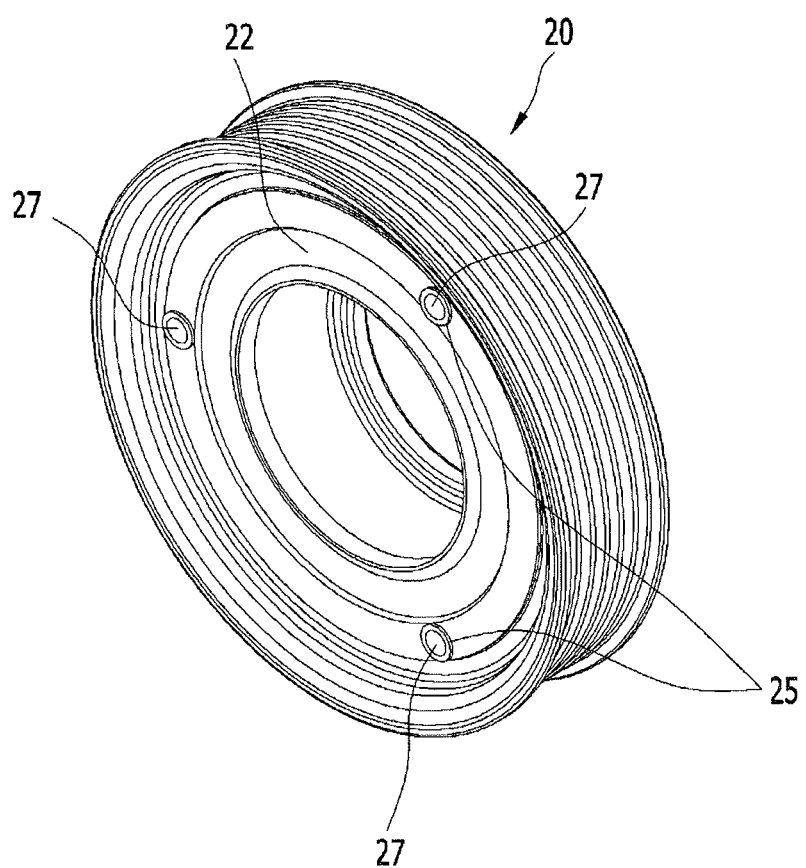
FIG. 4 is a perspective view showing an exemplary pulley part according to the present invention.

FIG. 4 is a perspective view showing a pulley part according to exemplary embodiments of the present invention. As shown in FIG. 4, the hub coupling portions 25 protrude at a predetermined level from the hub contact surface 22. Protruding the hub coupling portions 25 from the hub contact surface 22 is for prevent liquid that corrodes metal from flowing into the coupling grooves 27.

Figure 5:
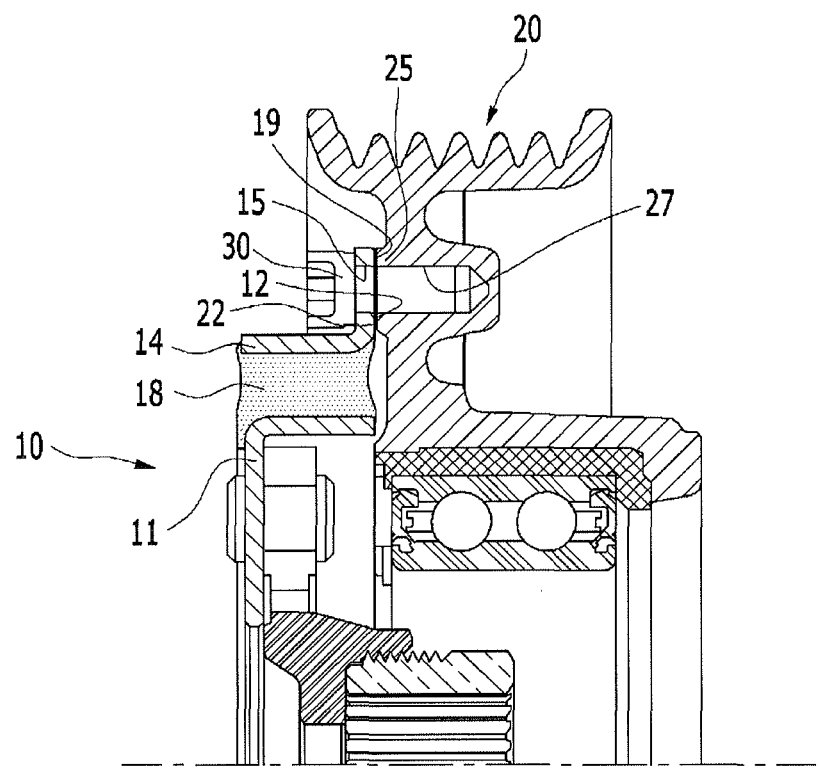
FIG. 5 is a cross-sectional view showing another exemplary assembled damper pulley according to the present invention.

FIG. 5 is a cross-sectional view showing the assembled damper pulley according to another exemplary embodiment of the present invention. As shown in FIG. 5, when the hub part 10 and the pulley part 20 are combined, direct contact between the pulley part 20 made of an aluminum alloy or a magnesium alloy and the coupling members 30 and the outer ring 14 that are made of steel is prevented by the molding 19 coated on the pulley contact surface 12. Accordingly, corrosion of the pulley part 20, the coupling members 30, and the outer ring 14 due to the potential difference between the pulley part 20 and the coupling members 30 or the pulley part 20 and the outer ring 14 can be prevented.

Since the molding 19 is provided in this exemplary embodiment of the present invention, the washers 17 may not be provided, as compared with the previous exemplary embodiment of the present invention. Further, in various embodiments of the present invention, since corrosion due to the potential difference between the pulley part 20, the coupling members 30, and the outer ring 14 is prevented, the pulley part 20 made of an aluminum alloy or a magnesium alloy can be used without difficulty. When the pulley part 20 is made of an aluminum alloy or a magnesium alloy, the entire weight of the damper pulley reduces as compared with when the pulley part 20 is made of steel.

As described above, according to various embodiments of the present invention, since the washer 17 are disposed to prevent one side of the hub part 10 and the coupling members 30 from coming in direct contact with the pulley part 20, corrosion due to a potential difference can be prevented. Further, since the side of the hub part 10 that may come in direct contact with the pulley part 20 is coated, corrosion due to a potential difference can be prevented.

For convenience in explanation and accurate definition in the appended claims, the terms "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A damper pulley, comprising:
   a hub part that is fitted on a crankshaft rotated by power from an engine and rotates with the crankshaft; and
   a pulley part coupled with the hub part to rotate with the hub part and connected with a power transmission member, wherein
   the hub part includes:
      an outer ring coupled with the pulley part,
      an inner ring disposed inside the outer ring,
      a damper rubber disposed between the outer ring and the inner ring,
      a pulley contact surface on the outer ring facing the pulley part, and
      pulley coupling portions formed at the pulley contact surface so that coupling members pass through the outer ring,
   the pulley part include:
      a hub contact surface facing the pulley contact surface of the hub part,
      hub coupling portions coupled to the pulley coupling portions by securing the coupling members, and
      coupling grooves recessed from the hub coupling portions to insert the coupling members, and
   a molding made of an insulator is coated on the pulley contact surface.

2. The damper pulley of claim 1, wherein the hub coupling portions protrude at a predetermined level from the hub contact surface.

3. The damper pulley of claim 1, wherein the molding extends from the damper rubber between the outer ring and the inner ring of the hub part to cover the pulley contact surface.

* * * * *